US010161251B2

(12) United States Patent
Bintz et al.

(10) Patent No.: US 10,161,251 B2
(45) Date of Patent: Dec. 25, 2018

(54) TURBOMACHINE ROTORS WITH THERMAL REGULATION

(71) Applicant: United Technologies Corporation, Farmington, CT (US)

(72) Inventors: Matthew E. Bintz, West Hartford, CT (US); Matthew P. Forcier, South Windsor, CT (US); Paul J. Hiester, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 209 days.

(21) Appl. No.: 14/851,588

(22) Filed: Sep. 11, 2015

(65) Prior Publication Data
US 2016/0076378 A1    Mar. 17, 2016

Related U.S. Application Data

(60) Provisional application No. 62/049,996, filed on Sep. 12, 2014.

(51) Int. Cl.
F01D 5/08 (2006.01)
F01D 25/12 (2006.01)
F01D 5/06 (2006.01)
F04D 29/58 (2006.01)
F04D 29/32 (2006.01)
F02C 7/18 (2006.01)

(52) U.S. Cl.
CPC .................. F01D 5/08 (2013.01); F01D 5/06 (2013.01); F01D 5/081 (2013.01); F01D 25/12 (2013.01); F02C 7/18 (2013.01); F04D 29/321 (2013.01); F04D 29/584 (2013.01); F05D 2220/30 (2013.01); F05D 2240/20 (2013.01); F05D 2260/20 (2013.01)

(58) Field of Classification Search
CPC .......... F01D 5/08; F01D 5/081; F04D 29/321; F02C 7/18
See application file for complete search history.

(56) References Cited

U.S. PATENT DOCUMENTS

| 4,795,307 | A  | 1/1989  | Liebl          |
| 7,775,764 | B2 | 8/2010  | Snowsill et al. |
| 2007/0189890 | A1 | 8/2007  | Snowsill et al. |
| 2010/0266387 | A1 | 10/2010 | Bintz et al.   |
| 2010/0303606 | A1 | 12/2010 | Black          |

(Continued)

OTHER PUBLICATIONS

European Search Report for Application No. 15184954.4; dated Feb. 8, 2016.

Primary Examiner — Richard A Edgar
Assistant Examiner — John S Hunter, Jr.
(74) Attorney, Agent, or Firm — Cantor Colburn LLP

(57) ABSTRACT

A rotor disk for a turbomachine includes a disk body, a rim configured to connect to or include a rotor blade disposed on a radially outward portion of the disk body, a bore defined in a radially inward portion of the disk body and configured to be radially adjacent to a shaft, and a thermal regulation aperture defined in the disk body, radially inward of the rim, for allowing flow to pass axially through the disk body when disposed in a stage of a turbomachine, and a thermal regulation aperture defined in the disk body for allowing flow to pass through the disk body when disposed in a stage of a turbomachine.

12 Claims, 1 Drawing Sheet

(56) References Cited

U.S. PATENT DOCUMENTS

2012/0171029 A1* 7/2012 Bintz ............... F01D 5/087
                                                    415/208.2
2014/0248122 A1   9/2014 Vetters et al.

\* cited by examiner

TURBOMACHINE ROTORS WITH THERMAL REGULATION

CROSS REFERENCE TO RELATED APPLICATIONS

This application claims the benefit of U.S. Provisional Patent Application Ser. No. 62/049,996, filed Sep. 12, 2014, the entire contents of which are incorporated herein by reference thereto.

BACKGROUND

The present disclosure relates to turbomachine components and systems, more specifically components and systems configured for thermal regulation thereof.

Turbomachine compressors include a series of blades connected to rotor disks which are operatively disposed on a shaft to rotate. Each blade has a corresponding stator, which together with the blade, form a stage. The disks can include pathways at the bore portion which connects to the shaft to allow cooling airflow to pass through close to the shaft.

Traditionally, a forward stage can include a bleed to allow cool air to flow from the rim of the rotor disk through a rotor cavity, down toward the shaft through the bore, and out to a pressure sink (e.g., turbine). However, this type of cooling minimally regulates temperature differentials in aft stages of the compressor. At certain operational regimes (e.g., during transient states), the rotor disks in aft stages can experience dramatic temperature differentials between the disk rim and the disk bore which stresses the disk material decreasing disk life. For example, when the engine accelerates from low power to high power, the rim is hotter than the bore causing material stress due to the temperature differential. When the engine decelerates from high power to low power, the bore is hotter than the rim and the reverse stress is encountered.

Such conventional methods and systems have generally been considered satisfactory for their intended purpose. However, there is still a need in the art for improved thermal regulation in turbomachines. The present disclosure provides a solution for this need.

BRIEF DESCRIPTION

In at least one aspect of this disclosure, a rotor disk for a turbomachine includes a disk body, a rim configured to connect to or include a rotor blade disposed on a radially outward portion of the disk body, a bore defined in a radially inward portion of the disk body and configured to be radially adjacent to a shaft, and a thermal regulation aperture defined in the disk body, radially inward of the rim, for allowing flow to pass axially through the disk body when disposed in a stage of a turbomachine, and a thermal regulation aperture defined in the disk body for allowing flow to pass through the disk body when disposed in a stage of a turbomachine.

The aperture can be disposed on a radially outward half of the disk body toward the rim. The aperture can be defined in the disk body to be a low stress hole to reduce material stress during rotational motion in a turbomachine. In embodiments, the aperture can be defined in the disk body to regulate flow therethrough.

The rim can include a bleed hole. The disk body can include a flange for supporting an anti-vortex tube thereon.

A plurality of circumferentially spaced thermal regulation apertures can be defined in the disk body. At least two of the thermal regulation apertures can include a different aperture shape from one another. At least two of the thermal regulation apertures can include a different radial position on the disk body.

In at least one aspect of this disclosure, a turbomachine includes a forward stage having a forward stage rotor disk with a forward stage rotor disk rim. The forward stage rotor disk is operatively disposed radially adjacent to a shaft at a forward stage rotor disk bore. The turbomachine also includes an intermediate stage, which is aft of the forward stage, including an intermediate stage rotor disk, and an aft stage, which is aft of the intermediate stage, including an aft stage rotor disk having an aft stage rotor disk bore. At least one bleed hole is included in at least one of an aft portion of the forward stage rotor disk rim or a forward portion of the intermediate stage rotor disk rim to allow cool air from the forward stage to pass through the rim, through the thermal regulation aperture, into a cavity between the intermediate stage and the aft stage and down to the aft stage rotor disk bore to regulate a temperature differential of the intermediate and/or aft stage rotor disk.

The intermediate stage rotor disk can include an intermediate stage disk body, an intermediate stage disk rim configured to connect to or include a rotor blade disposed on a radially outward portion of the intermediate stage disk body, an intermediate stage disk bore defined in a radially inward portion of the intermediate stage disk body and configured to be disposed radially adjacent to the shaft, and an intermediate stage rotor disk thermal regulation aperture disposed in the intermediate stage disk body for allowing flow to pass axially through the intermediate stage disk body.

The intermediate stage can include an anti-vortex tube disposed on an aft portion of the intermediate stage disk body between the intermediate stage and an aft stage. The turbomachine can further including a plurality of intermediate stages in axial sequence.

Each intermediate stage can include an anti-vortex tube disposed on an aft portion of the intermediate stage disk body. Each anti-vortex tube can be sized to balance fluid flow between each stage. In certain embodiments, only the aft stage includes an anti-vortex tube.

The intermediate stage rotor disk bore can be sealed or metered to only allow certain amounts of flow through the system.

The intermediate stage rotor disk thermal regulation aperture can be disposed on a radially outward half of the intermediate stage rotor disk body toward the intermediate stage rotor disk rim. The intermediate stage rotor disk thermal regulation aperture can be defined in the intermediate stage rotor disk body to be a low stress hole to reduce material stress during rotational motion. The intermediate stage rotor disk thermal regulation aperture can be defined in the intermediate stage rotor disk body to regulate flow therethrough. The turbomachine can further include a plurality of circumferentially spaced intermediate stage rotor disk thermal regulation apertures defined in the intermediate stage rotor disk body.

In one embodiment of the disclosure, a rotor disk for a turbomachine is provided. The rotor disk having: a disk body; a rim configured to connect to or include a rotor blade disposed on a radially outward portion of the disk body; a bore defined in a radially inward portion of the disk body, and configured to be radially adjacent to a shaft; and a thermal regulation aperture defined in the disk body, radially inward of the rim, for allowing flow to pass axially through the disk body when disposed in a stage of a turbomachine.

In addition to one or more of the features described above, or as an alternative to any of the foregoing embodiments, the aperture may be disposed on a radially outward half of the disk body toward the rim.

In addition to one or more of the features described above, or as an alternative to any of the foregoing embodiments, the aperture may be defined in the disk body to be a low stress hole to reduce material stress during rotational motion in a turbomachine.

In addition to one or more of the features described above, or as an alternative to any of the foregoing embodiments, the aperture may be defined in the disk body to regulate flow therethrough.

In addition to one or more of the features described above, or as an alternative to any of the foregoing embodiments, the rim may include a bleed hole.

In addition to one or more of the features described above, or as an alternative to any of the foregoing embodiments, the disk body may include a flange for supporting an anti-vortex tube thereon.

In addition to one or more of the features described above, or as an alternative to any of the foregoing embodiments, further embodiments may include a plurality of circumferentially spaced thermal regulation apertures defined in the disk body.

In addition to one or more of the features described above, or as an alternative to any of the foregoing embodiments, further embodiments may include at least two of the thermal regulation apertures with a different aperture shape.

In addition to one or more of the features described above, or as an alternative to any of the foregoing embodiments, further embodiments may include at least two of the thermal regulation apertures with a different radial position on the disk body.

In yet another embodiment of the disclosure, a turbomachine is provided. The turbomachine having: a forward stage including a forward stage rotor disk including a forward stage rotor disk rim, wherein the forward stage rotor disk is disposed radially adjacent to a shaft at a forward stage rotor disk bore; and an intermediate stage, which is aft of the forward stage, including an intermediate stage rotor disk, wherein the intermediate stage rotor disk includes: an intermediate stage disk body; an intermediate stage disk rim configured to connect to or include a rotor blade disposed on a radially outward portion of the intermediate stage disk body; an intermediate stage disk bore defined in a radially inward portion of the intermediate stage disk body and disposed radially adjacent to the shaft; and an intermediate stage rotor disk thermal regulation aperture disposed in the intermediate stage disk body radially inward of the rim for allowing flow to pass axially through the intermediate stage disk body; and an aft stage, which is aft of the intermediate stage, including an aft stage rotor disk having an aft stage rotor disk bore, wherein at least one bleed hole is included in at least one of an aft portion of the forward stage rotor disk rim or a forward portion of the intermediate stage rotor disk rim to allow cool air from the forward stage to pass through the rim, through the thermal regulation aperture, into a cavity between the intermediate stage and the aft stage and down to the aft stage rotor disk bore to regulate a temperature differential of the intermediate and/or aft stage rotor disk.

In addition to one or more of the features described above, or as an alternative to any of the foregoing embodiments, the intermediate stage of the turbomachine may include an anti-vortex tube disposed on an aft portion of the intermediate stage disk body between the intermediate stage and an aft stage.

In addition to one or more of the features described above, or as an alternative to any of the foregoing embodiments, further embodiments of the turbomachine may include a plurality of intermediate stages in axial sequence.

In addition to one or more of the features described above, or as an alternative to any of the foregoing embodiments, each intermediate stage of the turbomachine may include an anti-vortex tube disposed on an aft portion of the intermediate stage disk body.

In addition to one or more of the features described above, or as an alternative to any of the foregoing embodiments, each anti-vortex tube of the turbomachine may be sized to balance flow between each stage.

In addition to one or more of the features described above, or as an alternative to any of the foregoing embodiments, only the aft stage of the turbomachine includes an anti-vortex tube.

In addition to one or more of the features described above, or as an alternative to any of the foregoing embodiments, the intermediate stage rotor disk bore of the turbomachine may be sealed or metered to only allow certain amounts of flow through the system.

In addition to one or more of the features described above, or as an alternative to any of the foregoing embodiments, the intermediate stage rotor disk thermal regulation aperture of the turbomachine may be disposed on a radially outward half of the intermediate stage rotor disk body toward the intermediate stage rotor disk rim.

In addition to one or more of the features described above, or as an alternative to any of the foregoing embodiments, the intermediate stage rotor disk thermal regulation aperture of the turbomachine may be defined in the intermediate stage rotor disk body to be a low stress hole to reduce material stress during rotational motion.

In addition to one or more of the features described above, or as an alternative to any of the foregoing embodiments, the intermediate stage rotor disk thermal regulation aperture of the turbomachine may be defined in the intermediate stage rotor disk body to regulate flow therethrough.

In addition to one or more of the features described above, or as an alternative to any of the foregoing embodiments, the turbomachine may include a plurality of circumferentially spaced intermediate stage rotor disk thermal regulation apertures defined in the intermediate stage rotor disk body.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
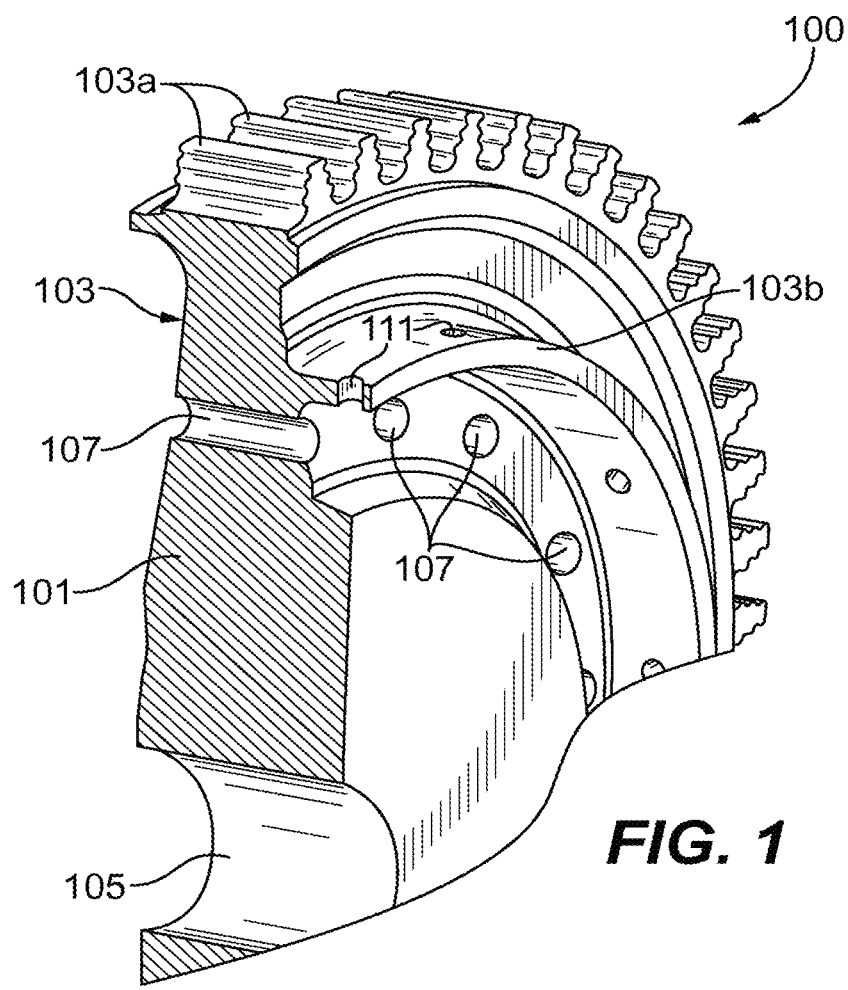
FIG. 1 is a partial perspective, cross-sectional view of an embodiment of a turbomachine rotor disk in accordance with this disclosure, shown with a plurality of thermal regulation apertures.

Reference will now be made to the drawings wherein like reference numerals identify similar structural features or aspects of the subject disclosure. For purposes of explanation and illustration, and not limitation, an illustrative view of an embodiment of a rotor disk in accordance with the disclosure is shown in FIG. 1 and is designated generally by reference character 100. The systems and methods described herein can be used to enhance thermal regulation of portions of a turbomachine (e.g., to reduce rotor disk temperature differential between the rim and the bore).

In at least one aspect of this disclosure, a rotor disk 100 for a turbomachine (e.g., for the compressor portion) includes a disk body 101, a rim 103 configured to connect to or include a rotor blade disposed on a radially outward portion of the rim 103, and a bore 105 disposed on a radially inward portion of the disk body 101 and configured to be disposed radially adjacent to a shaft such that there is a gap between the shaft and the rotor disk bore 105. The disk body 101 can be of any suitable shape, size, and/or thickness for use as a turbomachine rotor disk.

The rim 103 can include teeth 103a for attaching a blade thereto. While the rim 103 is shown including teeth 103a, any suitable blade attachment configuration is contemplated herein (e.g., a suitable attachment, an integrated bladed disk, etc.). The rim 103 can also include one or more flanges 103b extending axially in one or both of the forward or aft directions.

One or more thermal regulation apertures 107 are defined in the disk body 101 for allowing flow to pass through the disk body 101 when disposed in a stage of a turbomachine. The apertures 107 can be disposed on a radially outward half of the disk body 101 toward the rim 103 and/or in any other suitable location. In certain embodiments, the thermal regulation apertures 107 can be disposed close to the rim 103 (e.g., just underneath the rim).

In embodiments including a plurality of apertures 107, at least two of the thermal regulation apertures 107 can include a different aperture shape from one another. At least two of the thermal regulation apertures 107 can include a different radial position on the disk body 101.

In certain embodiments, the apertures 107 can be defined in the disk body 101 to be a low stress hole to reduce material stress during rotational motion in a turbomachine. In embodiments, the apertures 107 can be defined in the disk body 101 to regulate flow therethrough.

The rim 103 can include one or more bleed holes 111 disposed in any suitable location. The disk body 101 can also include a flange (e.g., flange 213 of rotor disk 100d in FIG. 2) for supporting an anti-vortex tube thereon.

Figure 2:
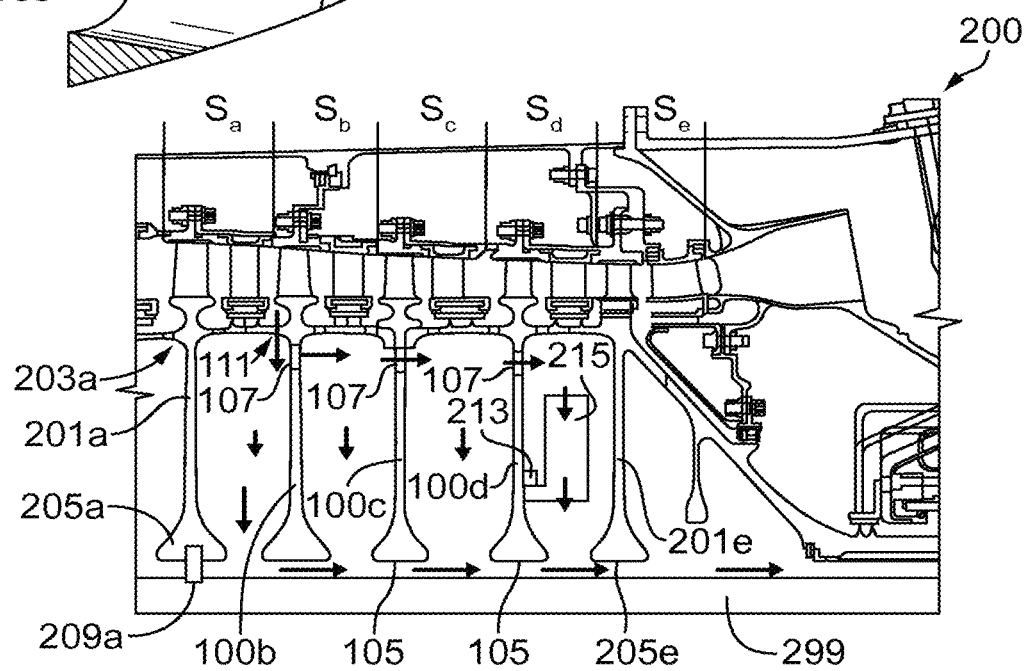
FIG. 2 is a partial cross-sectional view of an embodiment of a portion of a turbomachine in accordance with this disclosure, shown including a plurality of rotor disks in accordance with this disclosure.

Referring to FIG. 2, in at least one aspect of this disclosure, a turbomachine 200 includes a forward stage $S_a$ including a forward stage rotor disk 201a including a forward stage rotor disk rim 203a. The forward stage rotor disk 201a is operatively disposed around a shaft 299 at a forward stage rotor disk bore 205a such that the rotor disk 201a can rotate relative to the shaft 299 at a different speed than the shaft 299. The forward stage $S_a$ can be any suitable stage and does not need to be the first stage. The forward stage disk 201a can be sealed in any suitable manner (e.g., the disk may be solid below the rim 203a, a seal 209a may be included at the bore 205a between the inner diameter of the bore 205a and the outer diameter of the shaft 299 such that no flow can pass axially therethrough so as to prevent backflow.

The turbomachine 200 further includes an intermediate stage $S_b$, aft of the forward stage $S_a$, including an intermediate stage rotor disk 100b, similar to rotor disk 100 as described above with respect to FIG. 1. Intermediate stage rotor disk 100b is shown including a thermal regulation aperture 107 and a bore 105.

The forward stage $S_a$ includes at least one bleed hole 111 to allow air to bleed from the forward stage $S_a$ into the cavity between the forward stage rotor 201a and the intermediate stage rotor 100b. One or more bleed holes 111 can be defined at any suitable location (e.g., on an aft portion of the forward stage rotor disk rim 203a, at a forward portion of the intermediate stage rotor disk 100a).

As shown in FIG. 2, additional intermediate stages $S_c$, $S_b$, can optionally be included and can include intermediate stage rotor disks 100c, 100d similar to intermediate stage rotor disk 100b as described above. Additionally, intermediate stage rotor disk 100d can include a flange 213 configured to mate with an anti-vortex tube 215. While only one anti-vortex 215 tube is shown in intermediate stage $S_d$, any suitable number and/or combination of stages can include an anti-vortex tube 215. In some embodiments with a plurality of anti-vortex tubes 215, the anti-vortex tubes 215 can be sized to balance fluid flow between the rims and the bores of each stage such that a suitable radially inward flow is developed in each stage.

The turbomachine 200 also includes an aft stage $S_e$, which is aft of the intermediate stages $S_b$, $S_c$, $S_d$, and includes an aft stage rotor disk 201e having an aft stage rotor disk bore 205e. The aft stage $S_e$ can be configured to allow flow to travel through bore 205e to a pressure sink (e.g., turbine section) of the turbomachine 200.

As shown, the turbomachine 200 allows air from the forward stage $S_a$ to bleed through bleed hole 111 to allow cool air from the forward stage $S_a$ to pass through the rim 103 into the cavity between the forward stage rotor disk 201a and the intermediate stage rotor disk 100b. The flow can then pass through the thermal regulation aperture 107 of intermediate stage rotor disk 100b and into a cavity between the intermediate stage rotor disk 100b and the next intermediate stage rotor disk 100c. Some flow can travel radially inward toward the bore 105 of the intermediate stage rotor disk 100b and passes in an aft direction therethrough. The flow cannot pass forward through the forward stage rotor disk 201a because it is sealed at the bore 205a at seal 209a as described herein.

With each pass into a suitable intermediate stage, a portion of the flow passes through the thermal regulation aperture 107 and, if needed, a portion can travel radially inward and through the bore 105 of the respective stage thereof in a similar manner as described above with respect to the intermediate stage rotor disk 100b. As shown in FIG. 2, the final intermediate stage rotor disk 100d can include an anti-vortex tube 215 disposed on the aft side thereof as disclosed above to facilitate radial flow inward toward the shaft 299 such that the flow travels through aft stage bore 205e and to the pressure sink.

Creating such a flow path regulates a temperature differential of the intermediate and/or aft stage rotor disks such that the temperature differential between the rim and the bore of the rotor disks is reduced during high stress operational regimes. Any other suitable arrangement of forward, intermediate, aft stages, and pluralities thereof to create a desired flow path therebetween are contemplated herein.

The methods and systems of the present disclosure, as described above and shown in the drawings, provide for a turbomachine and/or rotor system with superior characteristics including enhanced thermal regulation. In addition and through various embodiments of the disclosure and by providing improved thermal regulation as disclosed herein, the rotor disk may be used at higher temperatures and pressures that may allow for a more efficient engine cycle enabled by higher compressor exit temperatures and pressures. Still further and by operating at these higher temperatures and pressures a more efficient fuel burn may be achieved. Thus, various embodiments of the present disclosure may allow for rotor disks to be used in higher temperature and/or pressure environments without necessarily adversely affecting the rotor disk operational life. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A turbomachine, comprising
a forward stage including a forward stage rotor disk including a forward stage rotor disk rim, wherein the forward stage rotor disk is disposed radially adjacent to a shaft at a forward stage rotor disk bore; and
a plurality of intermediate stages in axial sequence, which are aft of the forward stage, each intermediate stage including an intermediate stage rotor disk, wherein the intermediate stage rotor disk includes:
an intermediate stage disk body;
an intermediate stage disk rim connected to a rotor blade disposed on a radially outward portion of the intermediate stage disk body;
an intermediate stage disk bore defined in a radially inward portion of the intermediate stage disk body and disposed radially adjacent to the shaft; and
an aft stage, which is aft of an aftmost intermediate stage, including an aft stage rotor disk having an aft stage rotor disk bore,
wherein each intermediate stage rotor disk has an intermediate stage rotor disk thermal regulation aperture disposed in a radially outward portion of the intermediate stage disk body proximate to a radial rim that is opposite to a stator sealing structure of the turbomachine; and
wherein at least one bleed hole is included in at least one of an aft portion of the forward stage rotor disk rim or a forward portion of the foremost intermediate stage rotor disk rim to allow cool air from the forward stage to pass therethrough, and through the thermal regulation apertures of the plurality of intermediate stage rotor disks, into a cavity between the aftmost intermediate stage and the aft stage and down to the aft stage rotor disk bore to regulate a temperature differential of the intermediate and/or aft stage rotor disk.

2. The turbomachine of claim 1, wherein at least one of the intermediate stage disk bodies have a flange for supporting an anti-vortex tube thereon.

3. The turbomachine of claim 1, wherein the aftmost intermediate stage includes an anti-vortex tube disposed on an aft portion of the aftmost intermediate stage disk body between the aftmost intermediate stage and an aft stage.

4. The turbomachine of claim 1, wherein each intermediate stage includes an anti-vortex tube disposed on an aft portion of the intermediate stage disk body.

5. The turbomachine of claim 4, wherein each anti-vortex tube balances flow between each stage.

6. The turbomachine of claim 1, wherein only the aft stage includes an anti-vortex tube.

7. The turbomachine of claim 1, wherein the intermediate stage rotor disk bore or each intermediate stage rotor disk bore is sealed or metered to only allow certain amounts of flow therethrough.

8. The turbomachine of claim 1, wherein the intermediate stage rotor disk thermal regulation aperture reduces material stress during rotational motion.

9. The turbomachine of claim 1, wherein the intermediate stage rotor disk thermal regulation aperture regulates flow through each intermediate stage rotor disk.

10. The turbomachine of claim 1, wherein each intermediate stage rotor disk body has a plurality of circumferentially spaced intermediate stage rotor disk thermal regulation apertures defined therein.

11. The turbomachine of claim 10, wherein at least two of the plurality of thermal regulation apertures include a different aperture shape.

12. The turbomachine of claim 10, wherein at least two of the plurality of thermal regulation apertures include a different radial position on the disk body.

* * * * *